(12) United States Patent
Monti

(10) Patent No.: US 7,222,717 B2
(45) Date of Patent: *May 29, 2007

(54) DEVICE FOR COLLECTING AND RECYCLING ARTICLES DIRECTED TO FEEDING CHANNELS

(75) Inventor: Giuseppe Monti, Bologna (IT)

(73) Assignee: Marchesini Group S.p.A., Pianoro (IT)

( * ) Notice: Subject to any disclaimer, the term of this patent is extended or adjusted under 35 U.S.C. 154(b) by 119 days.

This patent is subject to a terminal disclaimer.

(21) Appl. No.: 11/019,427

(22) Filed: Dec. 22, 2004

(65) Prior Publication Data

US 2005/0211605 A1   Sep. 29, 2005

(30) Foreign Application Priority Data

Dec. 23, 2003   (IT)   .................. BO2003/A0776

(51) Int. Cl.
*B07B 1/40* (2006.01)
(52) U.S. Cl. .............. 198/445; 209/309; 209/240
(58) Field of Classification Search ........ 198/443–447, 198/455; 209/240, 309
See application file for complete search history.

(56) References Cited

U.S. PATENT DOCUMENTS

| | | | |
|---|---|---|---|
| 2,157,736 A | 5/1939 | Dooley et al. | |
| 3,011,678 A | 12/1961 | McClosky | |
| 3,960,738 A * | 6/1976 | O'Brien et al. | 430/137.1 |
| 4,485,912 A * | 12/1984 | Carmichael et al. | 198/382 |
| 5,027,938 A * | 7/1991 | Haggarty et al. | 198/358 |
| 5,052,167 A * | 10/1991 | Scharch | 53/444 |
| 5,236,077 A * | 8/1993 | Hoppmann et al. | 198/380 |
| 6,736,269 B2 * | 5/2004 | Monti | 209/240 |

FOREIGN PATENT DOCUMENTS

| | | |
|---|---|---|
| EP | 1325877 | 8/2003 |
| GB | 1322710 | 7/1973 |
| GB | 1495686 | 12/1977 |

* cited by examiner

*Primary Examiner*—Mark A. Deuble
(74) *Attorney, Agent, or Firm*—William J. Sapone; Coleman Sudol Sapone PC

(57) ABSTRACT

A hopper releases articles onto a selecting sieve which selects and keeps complying articles, separating them from defective and/or fragmented ones and from powders. A linear conveyor, situated downstream of the selecting sieve, receives the complying articles for sending them, in an orderly way, to inlets of a plurality of feeding channels. A collecting vessel is situated near the inlets and collects the exceeding articles accumulated near the inlets. A transferring container receives the exceeding articles coming from the collecting vessel and transfers them upstream of the selecting sieve.

9 Claims, 8 Drawing Sheets

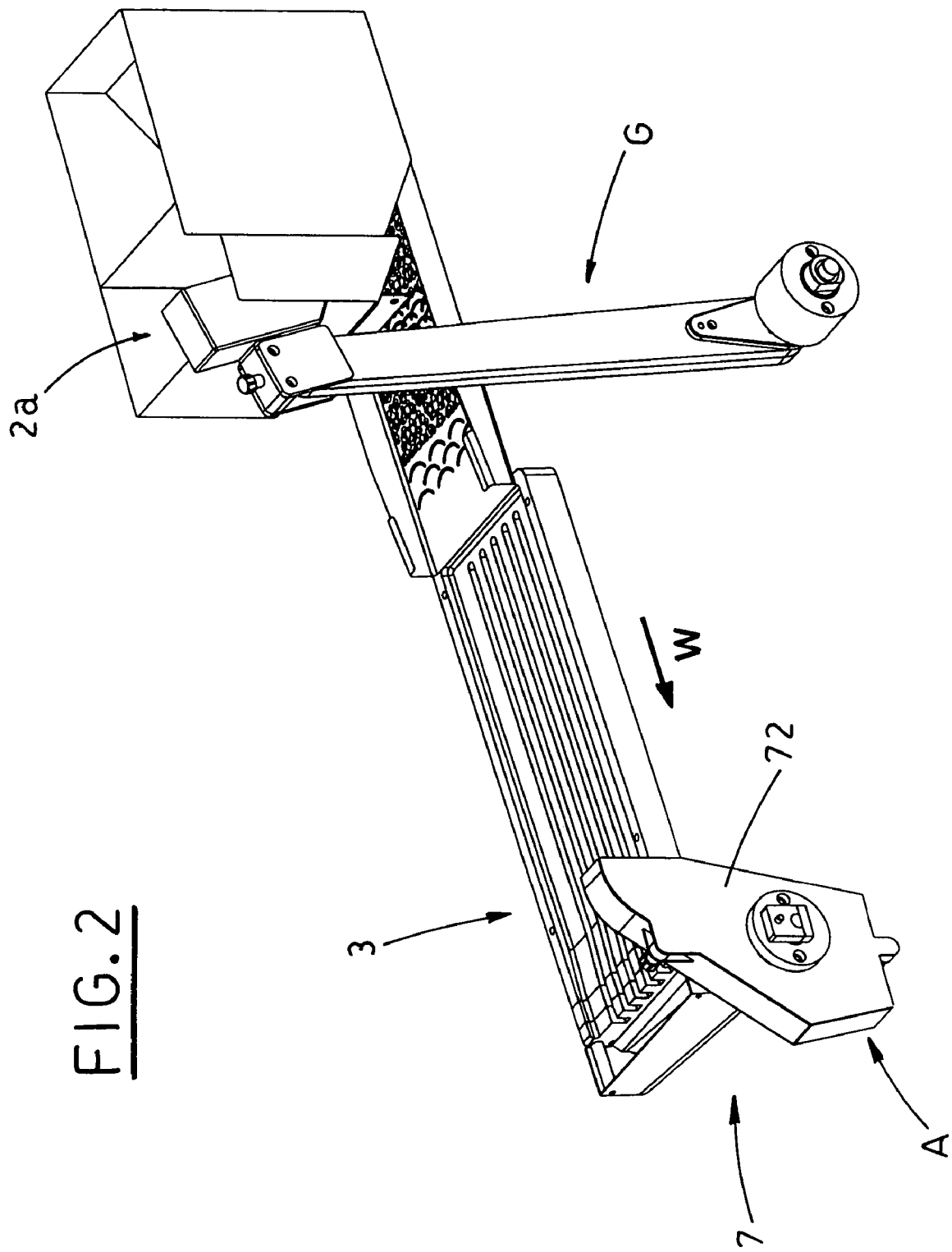

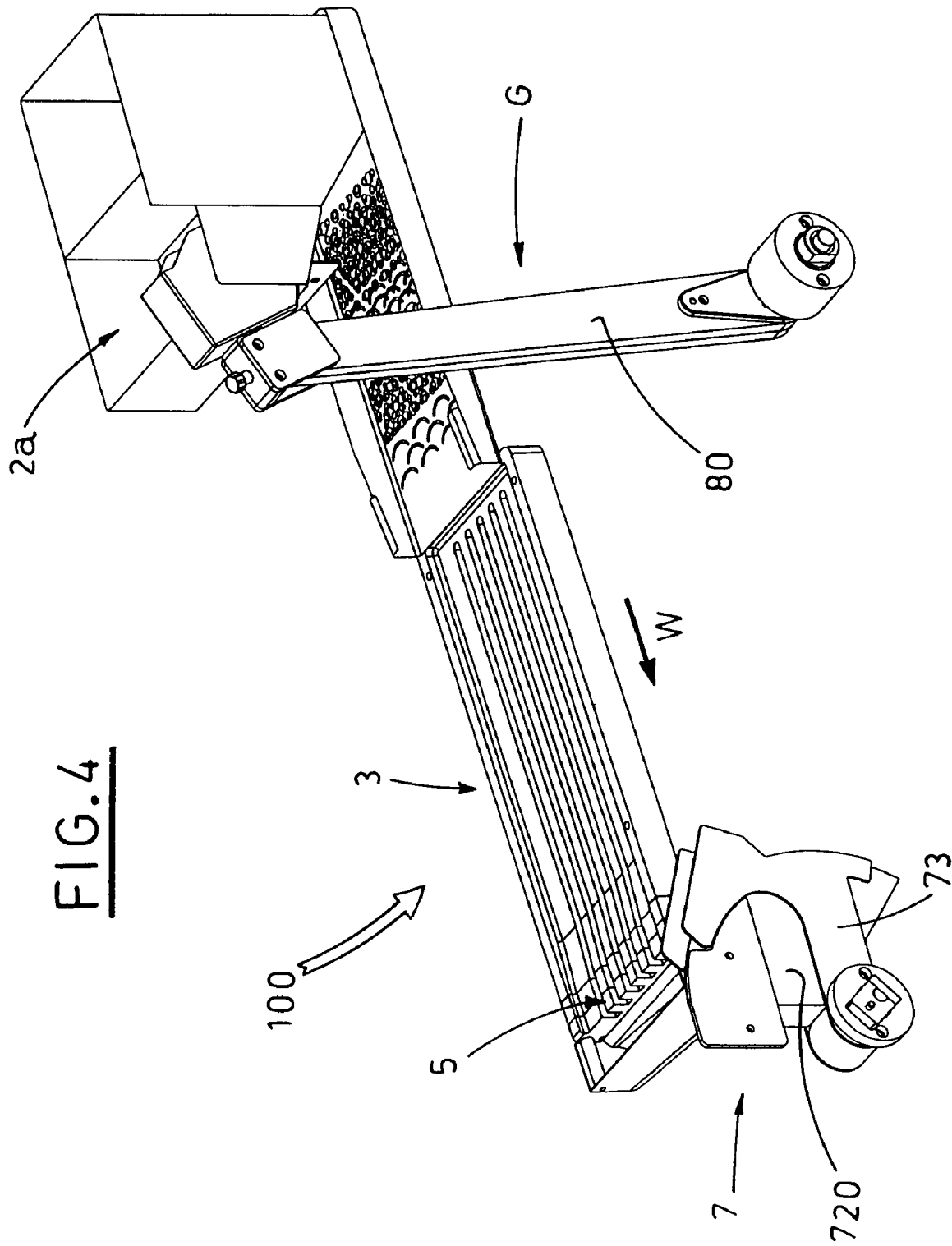

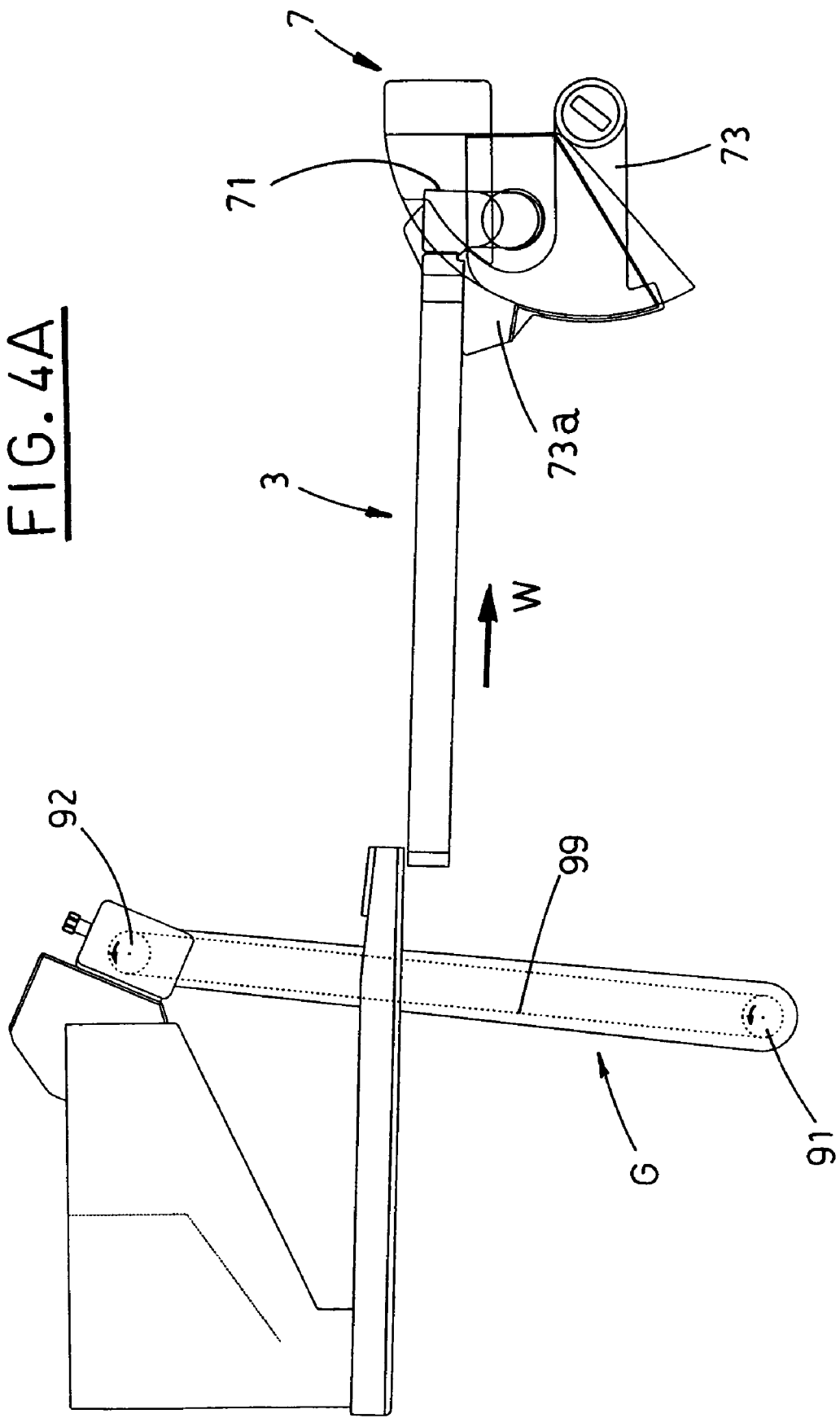

DEVICE FOR COLLECTING AND RECYCLING ARTICLES DIRECTED TO FEEDING CHANNELS

FIELD OF THE INVENTION

The present invention relates to a device for transferring articles coming from a magazine to inlets of channels for feeding blister bands.

More precisely, the present invention relates to a device for gathering and recycling articles, such as tablets, capsules, pills and the like, sent to feeding channels, in particular for feeding blister bands.

DESCRIPTION OF THE PRIOR ART

There are devices for transferring articles coming from a collecting magazine, which include a vibrating linear conveyor, situated downstream or below the magazine and aimed at arranging and sending the articles to the inlets of channels for feeding blister bands situated therebelow.

The operational mode, according to which the transferring devices convey the articles to the inlets of the feeding channels and the mode of feeding the blister bands by the channels are in accordance with known techniques; according to such techniques, a pre-established excess of the articles is defined in a region corresponding to the inlets.

The excess of the articles in the region corresponding to the channels inlets, can become unacceptable during the operation of the transferring devices.

For this purpose, the transferring devices according to prior art include means, which are operated mechanically for gathering the exceeding articles, bringing them back upstream, onto the vibrating conveyor.

For example, according to known techniques, there can be brush means, situated near to the inlets of the feeding channels and aimed at bringing the exceeding articles, accumulated near the inlets, back upstream onto the vibrating conveyor.

From the EP 0.555.662 a transferring device is known for small articles, which includes a first, forward linear vibrating conveyor, aimed at receiving the articles from an upper magazine and at transferring them downstream, arranging them in a correct position, to a subsequent feeding station, and a second, return vibrating conveyor, aimed at receiving, from the final section of the first conveyor, the articles, which are not correctly arranged and/or exceeding the required number, and at transferring them upstream, repositioning them in the initial section of the first conveyor.

The transfer of the exceeding or not correctly oriented and arranged articles from the first forward conveyor is obtained due to a particular way of mechanical operation of the first conveyor, caused to vibrate.

In its final section, the first conveyor has transversal elements, which send the exceeding articles to the second conveyor.

The devices for collecting exceeding articles according to prior art feature a relevant drawback—they do not control in any way the exceeding articles before their re-introduction to the conveyor.

This results in a non-rejection of articles, which could have been damaged during the collecting step in such a way that they cannot be packaged in blister packs.

Actually, it is to be pointed out that during any collecting operation, the exceeding articles can be subject to damages, such as scratches, chippings, fragmentations which can be caused by several impacts to which the articles are subjected.

SUMMARY OF THE INVENTION

The object of the present invention is to avoid the above disadvantages by proposing a device for collecting and recycling articles sent to feeding channels, which is capable of verifying the suitability and/or integrity of the collected articles before their re-sending to the inlets of the feeding channels.

Another object of the present invention is to propose a device which is particularly versatile and assures high reliability and productivity standards in any working conditions.

A further object of the present invention is to propose a particularly compact and strong device, which can be easily adapted to a wide range of sizes of the articles, such as tablets, pills, capsules and the like.

The above mentioned objects are obtained, in accordance with the contents of the claims, by a device for collecting and re-cycling articles sent toward feeding channels, comprising:

a container within which the articles are accumulated;

a selecting member, situated downstream of said container for receiving, in a predetermined way, said articles from said accumulation container, said selecting member selecting and holding complying articles, separating the complying articles from faulty, fragmented articles and from powders present among said articles;

a linear conveyor member, situated downstream of said selecting member, for receiving, from said selecting member, said complying articles and sending the complying articles to inlets of said feeding channels;

collecting means, situated directly downstream of said inlets for receiving, from said conveyor member, the exceeding articles accumulated near the inlets; and transferring means, for receiving, from said collecting means, exceeding articles and transferring said exceeding articles upstream of said selecting member, the exceeding articles being then verified as for being complying articles, then re-cycled only if verified as being complying articles.

BRIEF DESCRIPTION OF THE DRAWINGS

The characteristic features of the invention will be pointed out in the following description of some preferred but not exclusive embodiments, with reference to the enclosed figures, in which:

FIGS. 1 and 2 are corresponding schematic fore-lateral perspective views of a first embodiment of the proposed device in corresponding configurations of collecting and release;

FIGS. 3 and 4 shoe corresponding schematic fore-lateral perspective views of a second embodiment of the proposed device in corresponding configurations of collecting and release;

FIGS. 3A and 4A show corresponding schematic rear-lateral views of the device indicated respectively in FIGS. 3 and 4.

DISCLOSURE OF THE PREFERRED EMBODIMENTS

Figure 1:
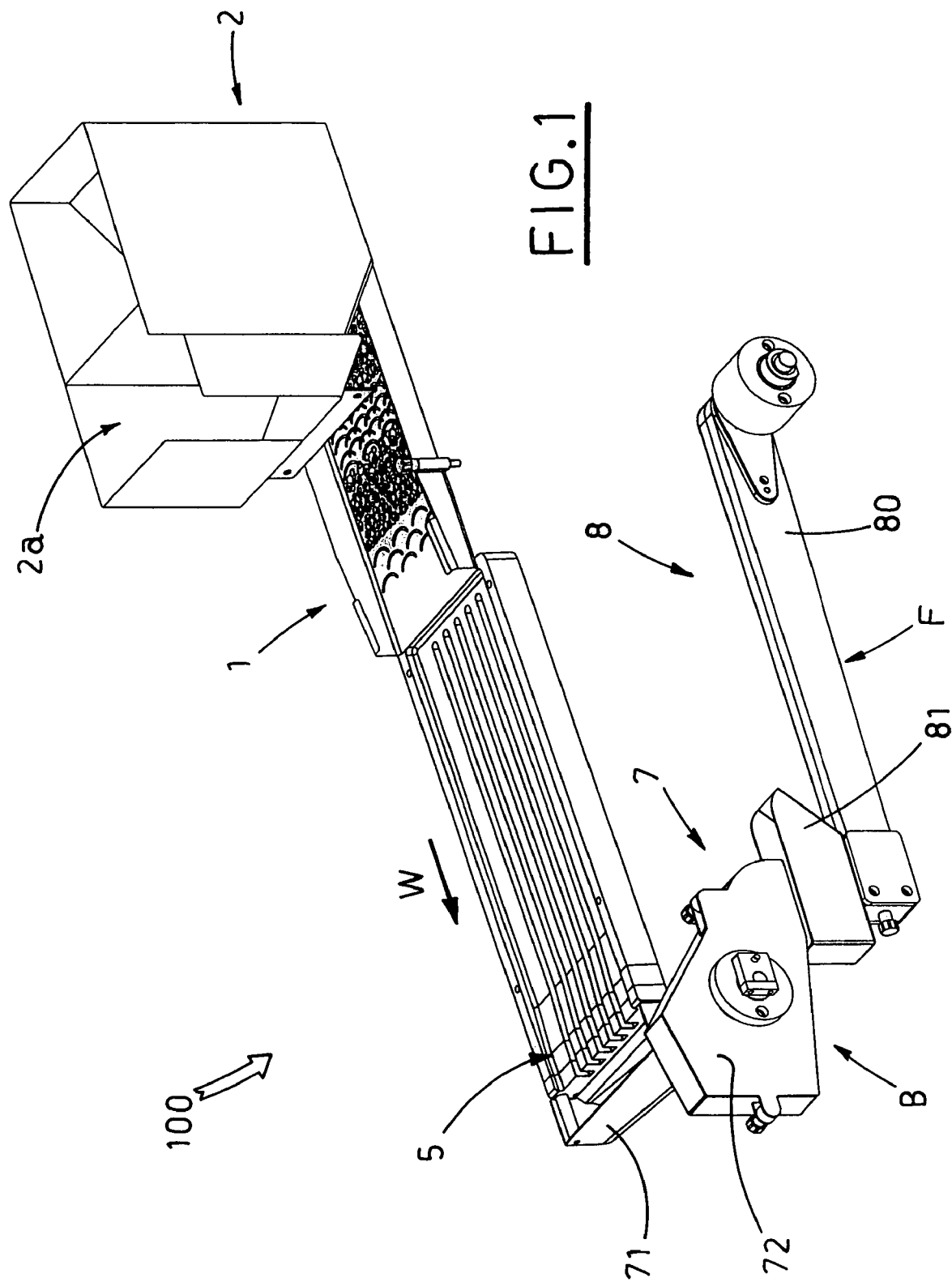

With reference to the enclosed figures, the general reference numeral 100 indicates the device proposed by the invention, for collecting and recycling articles to be sent to the feeding channels.

The device 100 includes a container 2 for storing articles, for example a hopper aimed at releasing the articles onto selecting means 1, situated downstream and intended for selecting and keeping suitable articles, separating them from the defective and/or fragmented ones and from the powders always present with them.

As it is seen from the enclosed figures, the selecting means 1 can include for example, a vibrating sieve with a unit (not shown) connected to the lower part of the sieve for collecting articles rejected by the sieve.

Therefore, the vibrating sieve 1 can select and keep only those articles received from the hopper 2, which result suitable, that is which are not damaged, scratched, fragmented, that is to say having a volumetric conformation equal to or bigger than a desired and pre-established minimum dimension.

Moreover, the vibrating sieve 1 frees the articles from dust, due to the vibrating motion, by separating them from the pulverulent particles associated thereto.

According to known techniques, the vibrating sieve 1 can have in its upper part a suitable skimmer member (not shown), which spreads uniformly the articles coming from the hopper 2 onto the entire surface of the vibrating sieve 1 and regulates the height of the articles store.

Linear conveying means 3 are situated downstream of the selecting means 1 and are aimed at receiving, from the latter, the good-checked articles and at sending them in an orderly way, according to a forward movement direction W, to a plurality of inlets 5 of relevant feeding channels.

Advantageously, the linear conveying means 3 can include a vibrating conveyor, inclined toward the inlets 5 of the relative feeding channels.

The articles taken into consideration, for example tablets, capsules, pills and the like, are sent through the feeding channels to the blister bands situated below (not shown), from which the blister packs will be obtained.

Collecting means 7, situated near the inlets 5, downstream thereof, are provided for collecting the exceeding articles coming from the linear conveying means 3 and accumulated in a region corresponding to the inlets 5.

The proposed device 100 includes advantageously transferring means 8, which receive the exceeding articles coming from the collecting means 7 and transfer them upstream of the selecting means 1, so as to perform on them a suitability and/or integrity check. Only the suitable articles are then collected and reused.

In this way, also the collected articles to be recycled are verified again regarding their suitability, because it is possible that, during the transferring, the articles are damaged (e.g. scratched, chipped) and thus become fragmented, that is their dimensions become not suitable or smaller than the pre-established minimum ones.

Thus, the vibrating sieve 1 can reject the defective articles.

According to a preferred embodiment of the device 100 proposed by the invention, a collecting section 2a is connected to the storing container 2 for receiving directly the exceeding articles released by the transferring means 8.

Figure 1A:
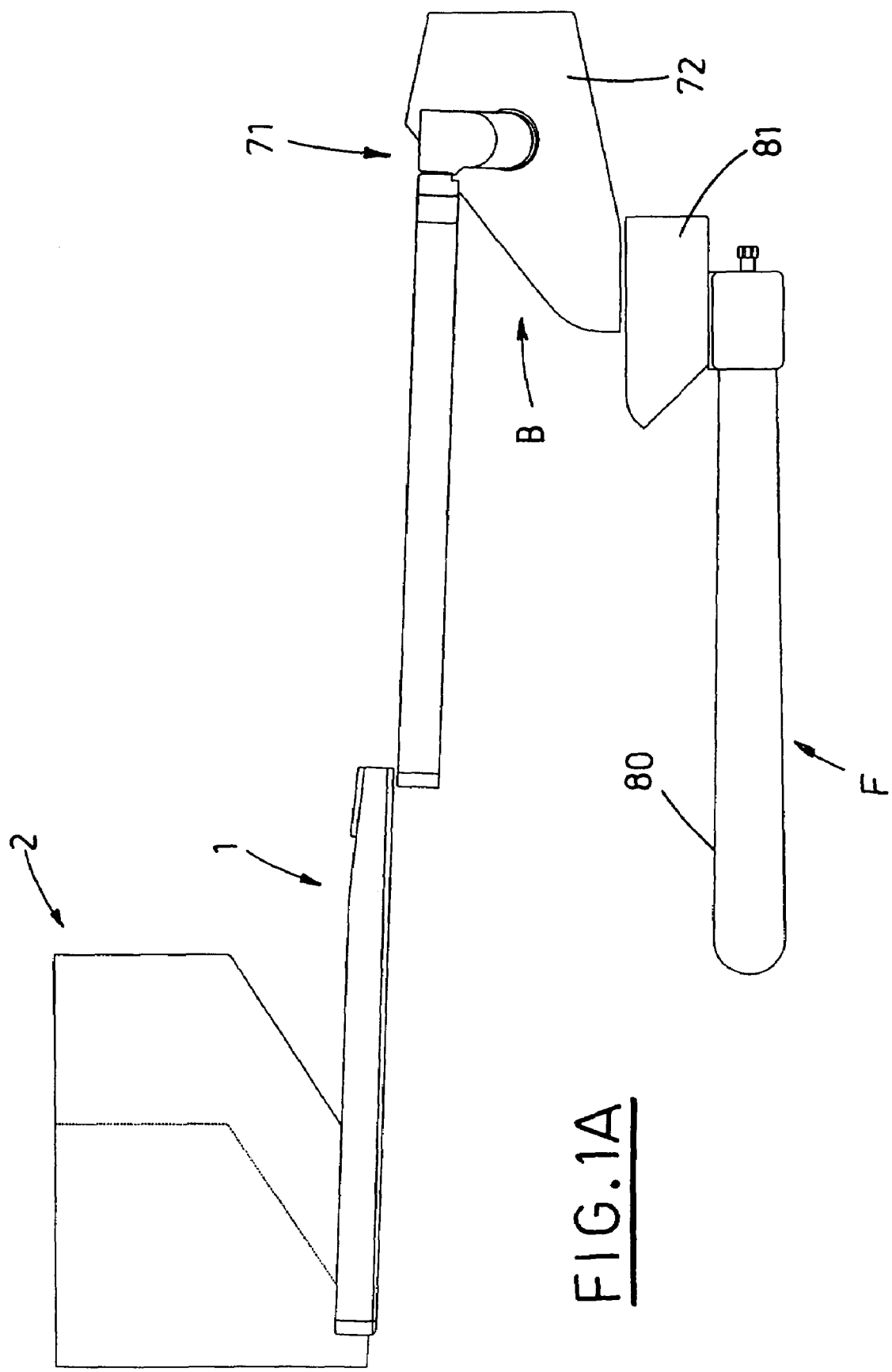
FIGS. 1A and 2A are relative schematic rear-lateral views of the device indicated respectively in FIGS. 1 and 2.
Figure 2A:
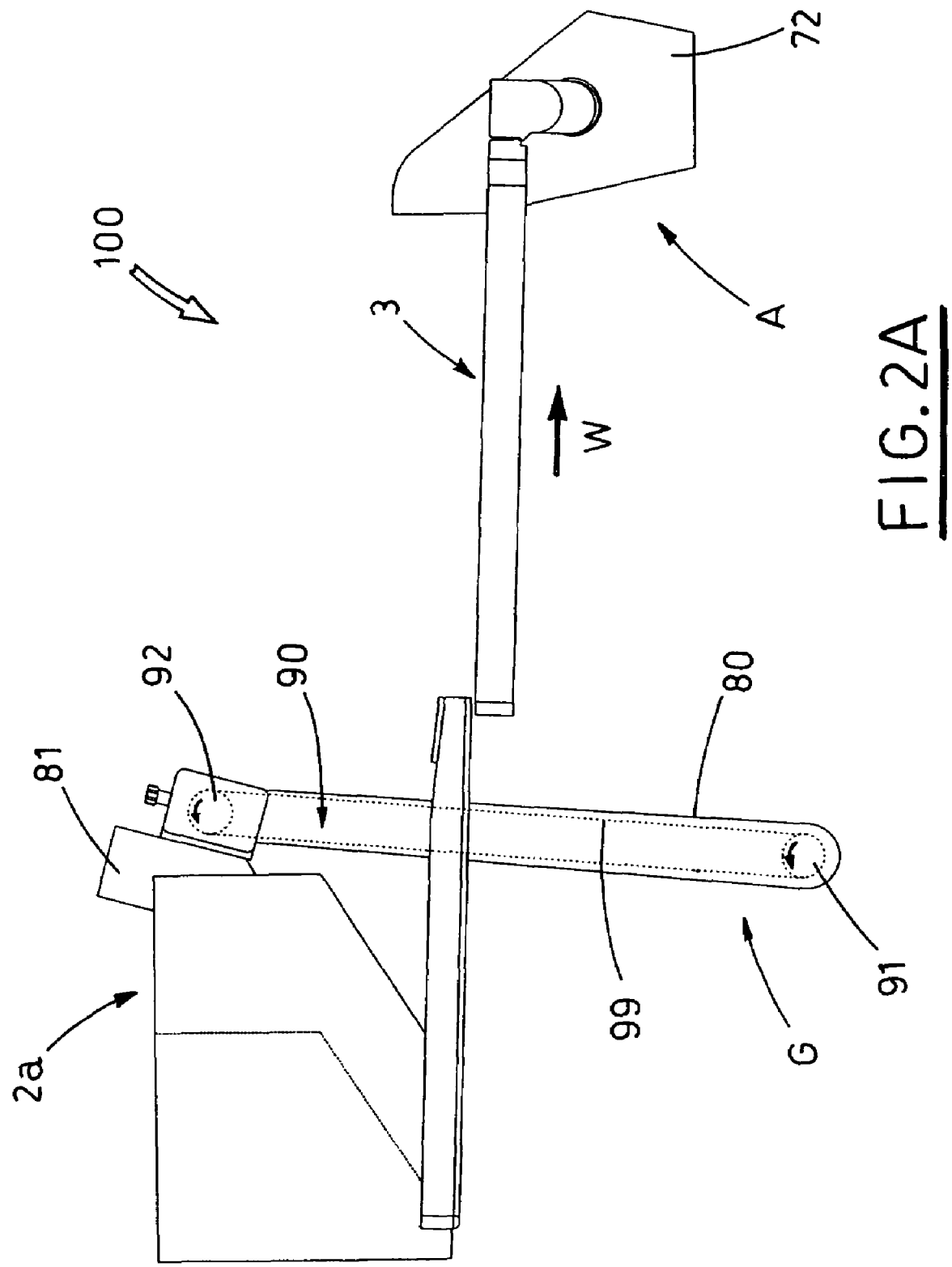

With reference to FIGS. 1, 1A, 2, 2A concerning a first embodiment of the device 100 proposed by the invention, the collecting means 7 include a chute 71, situated downstream of the inlets 5, and aimed at receiving the exceeding articles and releasing them to a collecting vessel 72, which is situated at a lower level and moved to rotate from a first store configuration A (FIG. 2, 2A), in which it receives and collects the exceeding articles, to a second release configuration B (FIG. 1, 1A), in which it releases the exceeding articles to the transferring means 8, without interfering with the latter during the moving step.

In this case, the supplying opening of the chute 71 is substantially coaxial with the rotation axis of the collecting vessel 72, thus allowing advantageously to bring continuously the exceeding articles back to the latter.

Figure 3:
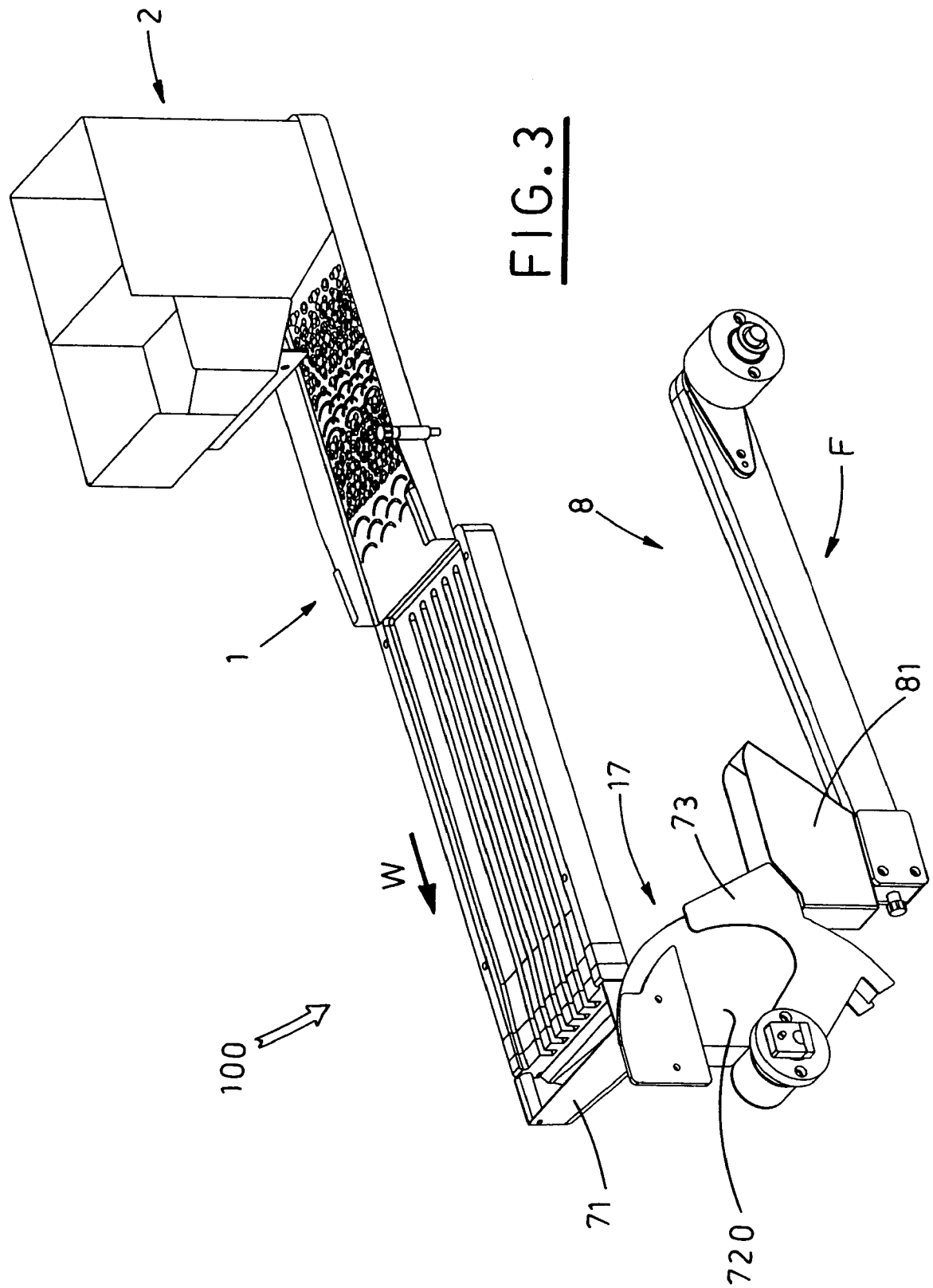
Figure 3A:
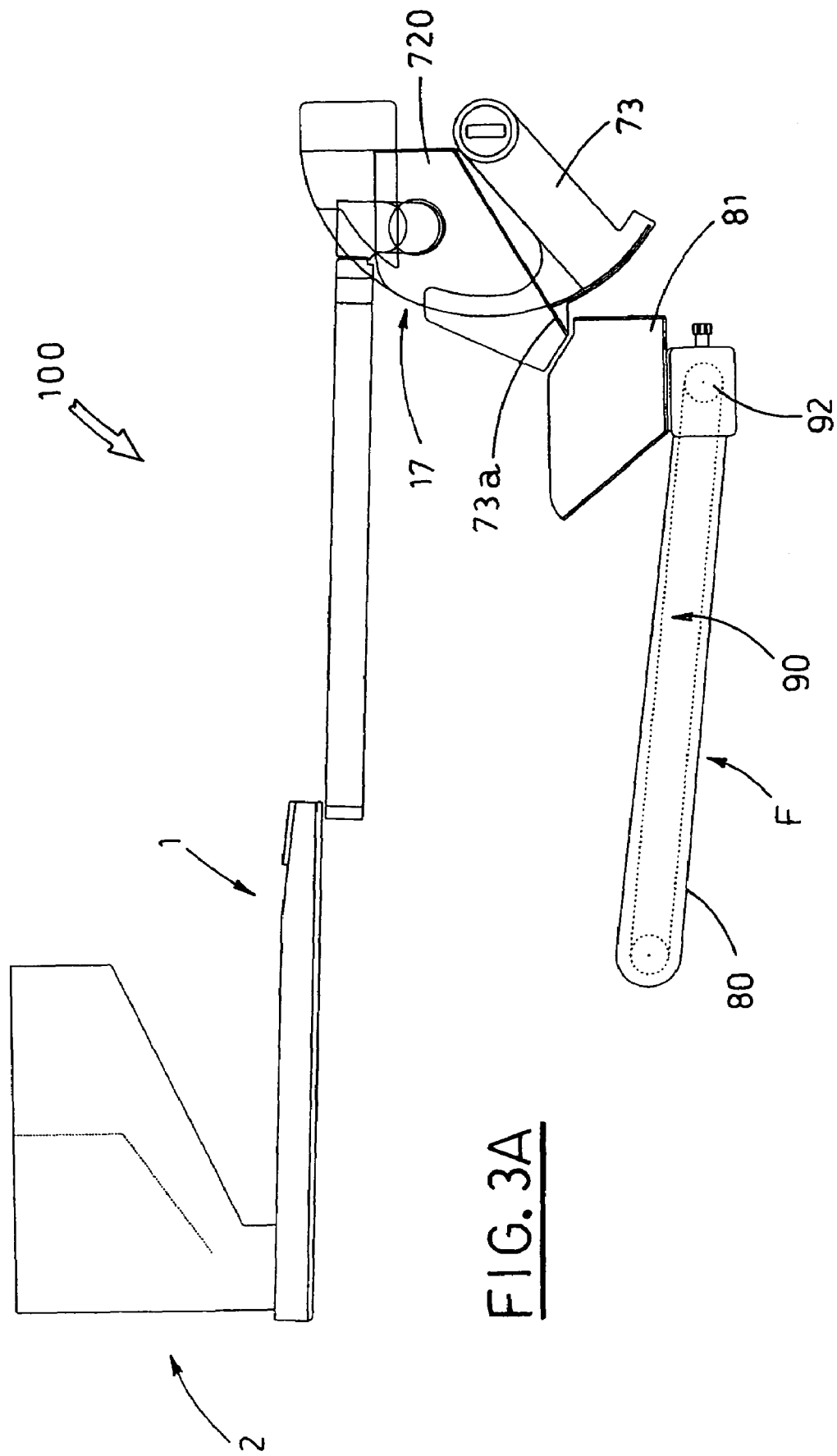

With reference to FIGS. 3, 3A, 4, 4A concerning a second embodiment of the proposed device 100, the collecting means 7 include again a chute 71, situated downstream of the inlets 5 and aimed at receiving the exceeding articles and releasing them to a motionless collecting vessel 720, situated at a lower level and having a discharge opening 17, associated with a mobile closing plate 73, normally in closed configuration for accumulating the exceeding articles within the motionless collecting vessel 720.

The closing plate 73 is operated to open, so as to discharge the exceeding articles through the discharge opening 17 onto the transferring means 8, in known way and at prefixed time.

Advantageously, the closing plate 73 is shaped in such a way, as not to interfere during the opening step with the transferring means 8 aimed at receiving the exceeding articles.

For example, the closing plate 73 includes, on both sides, plates which enclose between them the motionless collecting vessel 720 extending parallel to its lateral walls, remaining tightly adhering thereto.

A front wall is associated to the lateral walls and is aimed at closing and uncovering the discharge opening 17, during the rotation of the plates with respect to the same operating axis, in order to choke the flow of exceeding articles going out from the motionless collecting vessel 720.

The front wall has a guide 73a, which conveys the flow of the exceeding articles through the discharge opening 17.

The transferring means 8 include a container 81, which receives the exceeding articles released by the collecting vessel 72, 720.

The container 81 is carried by an oscillating arm 80 operated alternately, with respect to an axis substantially orthogonal to the forward movement direction W, from a first end configuration F (FIGS. 1, 1A, 3, 3A), in which the container 81 receives the exceeding articles from the collecting vessel 72, 720, to a second end configuration G (FIGS. 2, 2A, 4, 4A), in which the container 81 releases the exceeding articles upstream of the vibrating sieve 1, in particular in the collecting section 2a associated to the hopper 2.

The device 100 proposed by the invention includes operative means 90, connected to the oscillating arm 80 and maintaining substantially the same orientation of the container 81 during the transition of the oscillating arm 80 between the respective end configurations, first F and second G.

Advantageously, when in its second end configuration G, the oscillating arm 80 cooperates with means, for example interacting with the operative means 90, which overturn the container 81 and consequently cause the discharge of the exceeding articles into the collecting section 2a.

For example, the operative means 90 capable of maintaining the orientation of the container 81 include an endless driving belt 99, which is mounted onto a first pulley 91, coaxial with the rotation axis of the oscillating arm 80 and kept motionless during the transition between the respective end configurations F, G, and on a second pulley 92, keyed onto an articulation pin of the container 81 with respect to the oscillating arm 80.

At the second end configuration G, the means interacting with the oscillating arm 80, which cause the overturning of the container 81, include operating means (not shown), which act on the first pulley 91 and consequently determine the rotation of the second pulley 92 and of the container 81, connected thereto.

It results obvious from the above description how the proposed device allows, in a simple and efficient way, collection of the exceeding articles accumulated near the inlets of the feeding channels.

Moreover, the device proposed by the present invention allows, in an extremely advantageous way, the verify of the suitability and/or integrity of the collected articles before their re-sending them to the inlets of the feeding channels, thus allowing rejection of those articles which have been damaged during the collecting step, for example scratched, chipped, fragmented, or on which the pulverulent substances have deposited.

The above mentioned advantages are obtained by a technical solution, which is extremely functional and reliable in any working conditions.

It is understood that the proposed invention has been described, with reference to the enclosed figures, as a mere, not limiting example. Therefore, it is obvious that any changes or variants applied thereto remain within the protective scope defined by the following claims.

What is claimed is:

1. A device for collecting and re-cycling articles sent toward feeding channels, comprising:
   a container within which the articles are accumulated;
   a selecting member, situated downstream of said container for receiving, in a predetermined way, said articles from said accumulation container, said selecting member selecting and holding complying articles, separating the complying articles from faulty, fragmented articles and from powders present among said articles;
   a linear conveyor member, situated downstream of said selecting member, for receiving, from said selecting member, said complying articles and sending the complying articles to inlets of said feeding channels;
   collecting means, situated directly downstream of said inlets for receiving, from said conveyor member, the exceeding articles accumulated near the inlets; and
   transferring means, for receiving, from said collecting means, exceeding articles and transferring said exceeding articles upstream of said selecting member, the exceeding articles being then verified as for being complying articles, then re-cycled only if verified as being complying articles.

2. A device according to claim 1, wherein said collecting means include a chute, situated downstream of said inlets for receiving the exceeding articles from said conveyor member, and transferring the exceeding articles into a collecting vessel, situated at a lower level and moving from a first store configuration, in which it receives and collects said exceeding articles, to a second release configuration, in which it releases the exceeding articles to said transferring means, without interfering with the latter.

3. A device according to claim 1, wherein said collecting means include a chute, situated downstream of said inlets for receiving said exceeding articles and for releasing them to a motionless collecting vessel, situated at a lower level and having a discharge opening, associated with a moving closing plate, normally in closed configuration for allowing the exceeding articles to be stored in said motionless collecting vessel, said closing plate being operated to open for discharging the exceeding articles through said discharge opening onto said transferring means, in known way and at prefixed times; said closing plate having such a shape as not to interfere during the opening step with said transferring means.

4. A device according to claim 3, wherein said closing plate includes, on both sides, plates enclosing said motionless collecting vessel extending parallel to lateral walls of said vessel and carrying a front wall for co-operating with said discharge opening, during rotation of said plates with respect to the same operation axis, in order to regulate the flow of exceeding articles going out from said motionless collecting vessel; said front wall having, in its upper part, a guide for conveying the flow of the exceeding articles through said discharge opening.

5. A device according to claim 1, wherein said transferring means include a container, which receives exceeding articles released by said collecting means and which is supported by an oscillating arm operated into alternate rotation, with respect to an axis substantially orthogonal to said forward movement direction, from a first end configuration, in which said container receives the exceeding articles from said collecting means, to a second end configuration, in which said container releases the exceeding articles upstream of the selecting means; with said oscillating arm cooperating, in said second end configuration, with means capable of overturning said container and consequently letting the exceeding articles be discharged.

6. A device according to claim 5, further including operative means, connected to said oscillating arm for maintaining substantially the same orientation of the container during the transition of said oscillating arm between the respective end configurations, first end configuration and second end configuration.

7. A device according to claim 6, wherein said means for overturning the container at said second end configuration co-operate with said operative means, which maintain the same orientation of said container.

8. A device according to claim 7, wherein said operative means, connected to said oscillating arm, include an endless driving belt mounted onto a first pulley, coaxial with the rotation axis of said oscillating arm and kept motionless during the transition between the respective end configurations, and onto a second pulley, keyed onto an articulation pin of said container with respect to the oscillating arm, said operative means also including power means acting on said first pulley, so as to overturn said container in said second end configuration.

9. A device according to claim 1, further including a collecting section, situated in said storing container and receiving said exceeding articles released by said transferring means.

* * * * *